US012776734B2

(12) United States Patent
Qin et al.

(10) Patent No.: US 12,776,734 B2
(45) Date of Patent: Oct. 27, 2026

(54) VEHICLE AND ACTIVE DAMPING CONTROL METHOD THEREFOR, AND VEHICLE CONTROLLER

(71) Applicant: BYD COMPANY LIMITED, Shenzhen (CN)

(72) Inventors: Tao Qin, Shenzhen (CN); Chunsheng Wang, Shenzhen (CN); Boliang Xu, Shenzhen (CN); Wei Xiong, Shenzhen (CN); An Cao, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 155 days.

(21) Appl. No.: 18/758,734

(22) Filed: Jun. 28, 2024

(65) Prior Publication Data

US 2024/0356473 A1 Oct. 24, 2024

Related U.S. Application Data

(63) Continuation of application No. PCT/CN2023/078389, filed on Feb. 27, 2023.

(30) Foreign Application Priority Data

Feb. 28, 2022 (CN) ........................ 202210187935.X

(51) Int. Cl.
*B60L 9/00* (2019.01)
*H02P 23/14* (2006.01)
*B60L 15/20* (2006.01)

(52) U.S. Cl.
CPC ............... *H02P 23/14* (2013.01); *B60L 15/20* (2013.01); *B60L 2240/423* (2013.01)

(58) Field of Classification Search
CPC ....... H02P 23/14; B60W 10/04; B60W 30/20; B60W 2050/0052; B60L 15/20;
(Continued)

(56) References Cited

U.S. PATENT DOCUMENTS

2012/0227943 A1 9/2012 Nakashima
2014/0107877 A1* 4/2014 Bang ....................... B60L 15/20 701/22

FOREIGN PATENT DOCUMENTS

CN 103895647 A 7/2014
CN 104057839 A 9/2014
(Continued)

OTHER PUBLICATIONS

International Search Report and Written Opinion for Application No. PCT/CN2023/078389, mailed on Jun. 8, 2023, 8 pages.
(Continued)

*Primary Examiner* — Adam M Alharbi
(74) *Attorney, Agent, or Firm* — Sheppard Mullin Richter & Hampton LLP

(57) ABSTRACT

A vehicle includes a motor and a motor controller. A damping control method for the vehicle includes: obtaining a rotation speed of the motor; filtering the rotation speed through a first low-pass filter to obtain a first filtered rotation speed, filtering the rotation speed through a second low-pass filter to obtain a second filtered rotation speed, and obtaining, by a vehicle controller, a rotation speed fluctuation value based on the first filtered rotation speed and the second filtered rotation speed; obtaining, by the vehicle controller, an active damping adjustment coefficient and an active damping clipped torque based on the rotation speed; obtaining, by the vehicle controller, an active damping torque based on the rotation speed fluctuation value, the active damping adjustment coefficient, and the active damping clipped torque; and controlling, by the motor controller, the motor based on the active damping torque.

18 Claims, 8 Drawing Sheets

(58) Field of Classification Search
CPC ......... B60L 2240/421; B60L 2240/423; B60L 2240/145; F16F 15/002; Y02T 10/07
See application file for complete search history.

(56) References Cited

FOREIGN PATENT DOCUMENTS

| | | | |
|---|---|---|---|
| CN | 105946623 | A | 9/2016 |
| CN | 103879303 | B | 4/2017 |
| CN | 107508523 | A | 12/2017 |
| CN | 104071031 | B | 4/2019 |
| CN | 111483330 | A | 8/2020 |
| CN | 111605411 | A | 9/2020 |
| DE | 102010055223 | A1 | 7/2011 |
| DE | 102016014552 | A1 | 6/2017 |
| JP | 2019022256 | A | 2/2019 |
| WO | 2021/176731 | A1 | 9/2021 |

OTHER PUBLICATIONS

Extended European Search Report dated Mar. 20, 2025, issued in European Patent Application No. 23759316.5 (16 pages).
Request for the Submission of an Opinion dated Sep. 12, 2025, issued in Korean Patent Application No. 10-2024-7023078, with English translation only (11 pages).
First Office Action and Search Report dated May 1, 2024, issued in Chinese Patent Application No. 202210187935.X, with English machine translation (14 pages).

* cited by examiner

VEHICLE AND ACTIVE DAMPING CONTROL METHOD THEREFOR, AND VEHICLE CONTROLLER

CROSS-REFERENCE TO RELATED APPLICATIONS

This application is a continuation application of International Patent Application No. PCT/CN2023/078389, filed on Feb. 27, 2023, which is based on and claims priority to and benefits of Chinese Patent Application 202210187935.X, filed on Feb. 28, 2022. The entire content of all of the above-referenced applications is incorporated herein by reference.

FIELD

The present disclosure relates to the technical field of vehicles, and more particularly, to a damping control method for a vehicle, a vehicle controller, and a vehicle.

BACKGROUND

To solve a problem of vehicle vibration, the related art provides a control method for calculating a compensation torque depending on whether a change rate of a rotation speed of a motor is positive or negative. In the method, a change rate of a rotation speed within 100 ms is calculated, it is determined whether the change rate is positive or negative, and a threshold is determined. If an absolute value of the change rate is greater than 1200, a value in a range of 2 Nm to 5 Nm is correspondingly compensated. A control target of the method is a scenario in which an acceleration of a motor is zero. When the acceleration is not zero, a compensation torque is applied. Therefore, the method is applicable to only application scenarios of working points with a fixed rotation speed, and is inapplicable to a vehicle condition with frequent acceleration and deceleration.

Moreover, the related art further provides a method, in which an acceleration sensor is mounted to a vehicle to collect a vehicle acceleration in real time, and the vehicle acceleration is controlled to be close to a reference acceleration through a PID, so as to obtain a compensation torque of each driving wheel and superimpose the compensation torque to an original torque to achieve active damping. A problem of the method is that an additional acceleration sensor needs to be added, which increases costs for the vehicle.

In addition, the related art further provides a method for suppressing vibration during startup while ensuring vehicle acceleration performance by increasing a step size of a motor in response to a vehicle expected moment and adding a rotation speed feedback link to correct the vehicle expected moment. In the rotation speed feedback link of the method, a vehicle acceleration torque is calculated through a vehicle resistance torque and a vehicle traction torque. However, it is difficult to calculate and measure the vehicle resistance torque. Therefore, an entire transmission system model is unavailable. Moreover, the method requires to establish an accurate mathematical model for the transmission system. Since the transmission system has many components, and a parameter and a characteristic of each component are related to a working environment and a usage time, it is difficult to establish an accurate model that works throughout a lifecycle. Since the vehicle resistance torque cannot be estimated and the mathematical model for the transmission system is inaccurate, a vehicle vibration suppression effect of the method is greatly reduced.

SUMMARY

A vehicle and a damping control method therefor, and a vehicle controller are provided. The method is applicable to a wide range of working conditions, is easy to implement and verify, and can effectively eliminate vehicle vibration at lower costs.

According to a first aspect, the present disclosure provides a damping control method for a vehicle. The vehicle includes a motor and a motor controller. The method includes: obtaining a rotation speed of the motor; filtering the rotation speed through a first low-pass filter to obtain a first filtered rotation speed, filtering the rotation speed through a second low-pass filter to obtain a second filtered rotation speed, and obtaining, by a vehicle controller, a rotation speed fluctuation value based on the first filtered rotation speed and the second filtered rotation speed; obtaining, by the vehicle controller, an active damping adjustment coefficient and an active damping clipped torque based on the rotation speed; obtaining, by the vehicle controller, an active damping torque based on the rotation speed fluctuation value, the active damping adjustment coefficient, and the active damping clipped torque; and controlling, by the motor controller, the motor based on the active damping torque.

According to the damping control method for a vehicle in the embodiments of the present disclosure, the rotation speed fluctuation value may be determined merely through the two low-pass filters based on a real-time rotation speed without a need to use a frequency, then the active damping torque is obtained based on the rotation speed fluctuation value, the active damping adjustment coefficient, and the active damping clipped torque, and then the motor is controlled through the motor controller based on the active damping torque. The method is applicable to a wide range of working conditions, is easy to implement and verify, and can effectively eliminate vehicle vibration at lower costs.

According to a second aspect, the present disclosure provides a vehicle controller, which includes a memory, a processor, and a computer program stored in the memory. The processor is configured to execute the computer program to implement the damping control method for a vehicle of the first aspect.

According to the vehicle controller in the embodiments of the present disclosure, the computer program corresponding to the damping control method for a vehicle stored therein is executed by the processor, so that vehicle vibration can be effectively eliminated at lower costs.

According to a third aspect, the present disclosure provides a vehicle, which includes a motor, a motor controller, and the vehicle controller of the second aspect.

According to the vehicle in the embodiments of the present disclosure, an architecture in which the motor controller and the above vehicle controller work in combination is implemented. The motor controller obtains a rotation speed of the motor and provides the rotation speed of the motor to the vehicle controller, the vehicle controller calculates a required active damping torque for the motor controller, and then the motor controller controls the motor based on the active damping torque. In this way, a communication delay time is reduced.

Part of additional aspects and advantages of the present disclosure is provided in the following description. The part will be apparent from the following description, or is learned by practice of the present disclosure.

DETAILED DESCRIPTION

Figure 1:
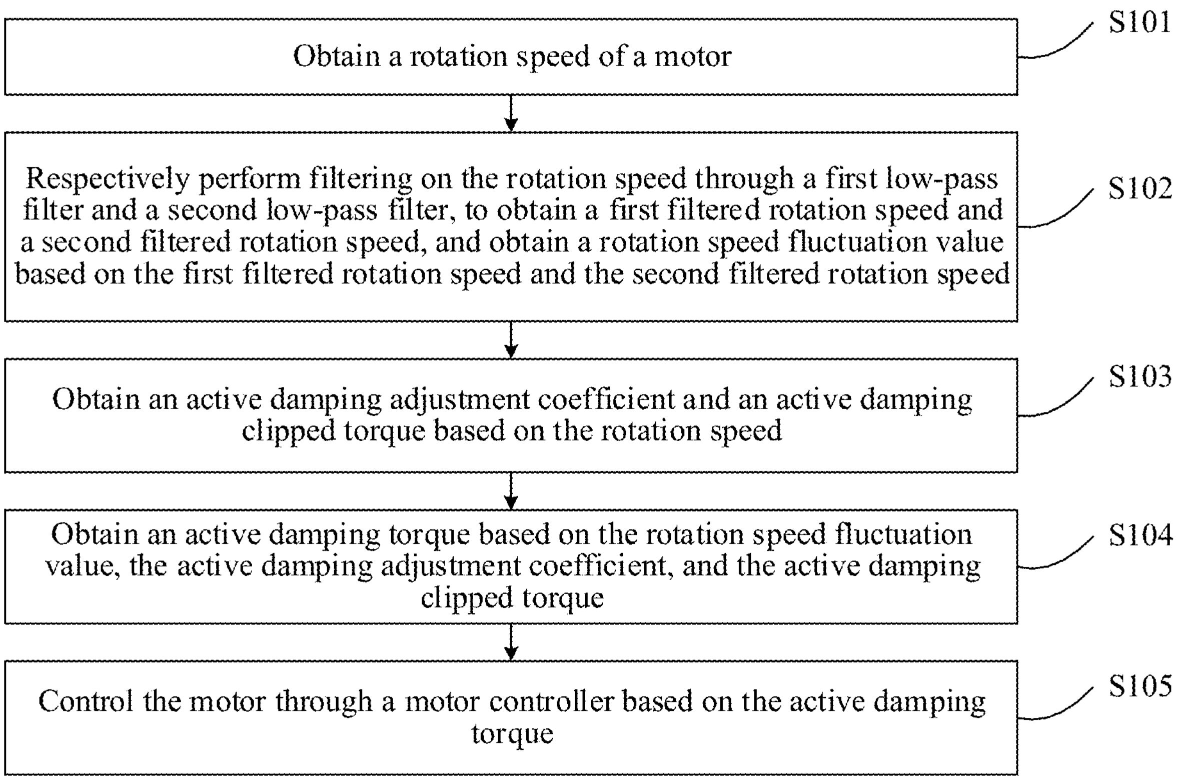
FIG. 1 is a schematic flowchart of a damping control method for a vehicle according to an embodiment of the present disclosure.

A vehicle and a damping control method therefor, and a vehicle controller in embodiments of the present disclosure are described below with reference to FIG. 1 to FIG. 10. The same or similar elements or the elements having the same or similar functions are denoted by the same or similar reference numerals throughout the description. The embodiments described with reference to the drawings are examples, and should not be construed as a limitation on the present disclosure.

FIG. 1 is a schematic flowchart of a damping control method for a vehicle according to an embodiment of the present disclosure. As shown in FIG. 1, the damping control method for a vehicle includes the following steps.

S101: A rotation speed of a motor is obtained.

In an embodiment, a motor controller may collect and calculate the rotation speed of the motor in real time through a resolver.

S102: Filtering is respectively performed on the rotation speed through a first low-pass filter and a second low-pass filter, to obtain a first filtered rotation speed and a second filtered rotation speed, and a rotation speed fluctuation value is obtained based on the first filtered rotation speed and the second filtered rotation speed, for example, by a vehicle controller.

That a rotation speed fluctuation value is obtained based on the first filtered rotation speed and the second filtered rotation speed may include the following steps. A difference between the first filtered rotation speed and the second filtered rotation speed is calculated, to obtain a first difference. A rotation speed fluctuation calculation coefficient is obtained, and a product of the rotation speed fluctuation calculation coefficient and the first difference is calculated, to obtain the rotation speed fluctuation value.

Figure 2:
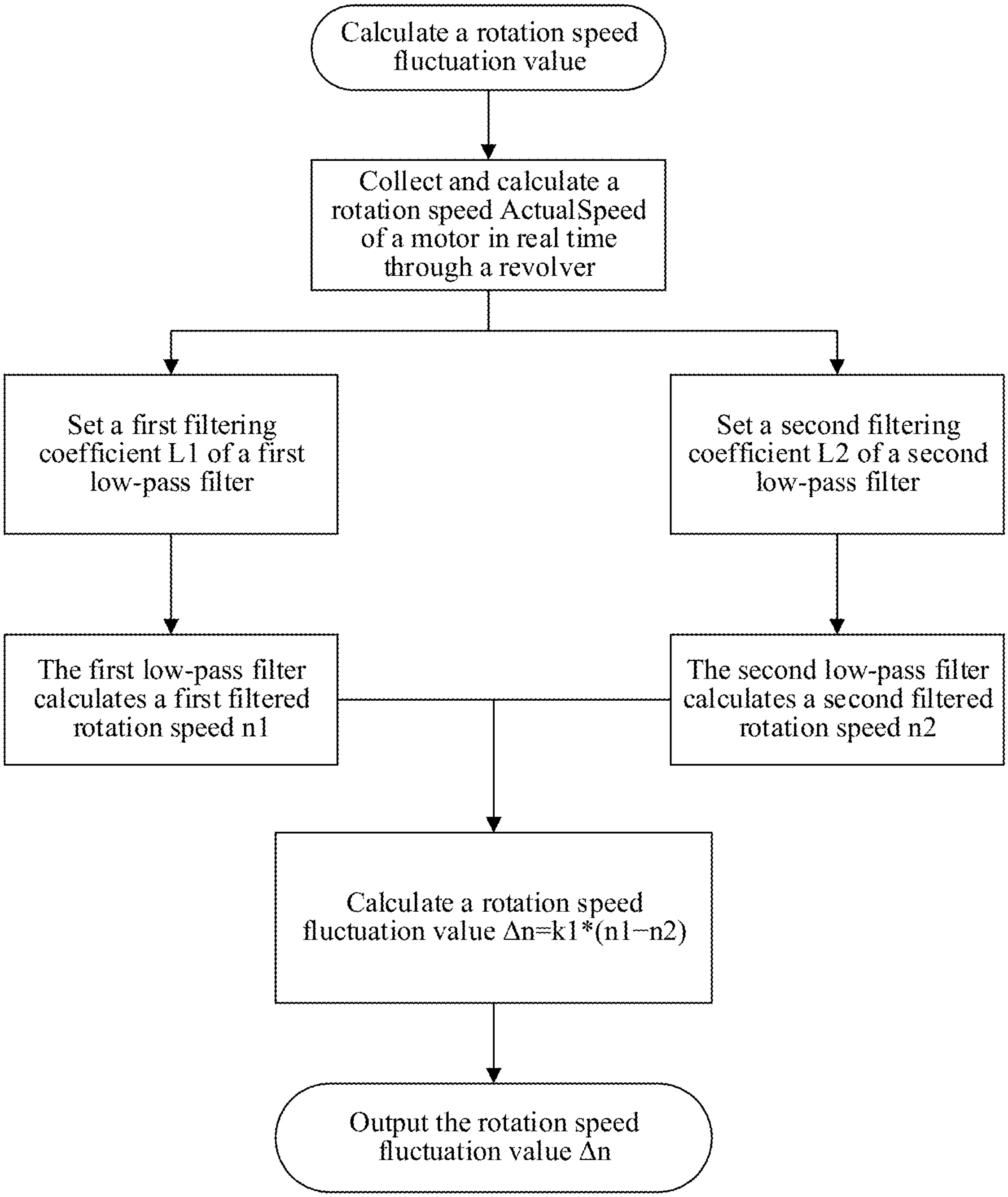
FIG. 2 is a schematic flowchart of calculating a rotation speed fluctuation value according to an embodiment of the present disclosure.

In an embodiment, referring to FIG. 2, the motor controller is configured to perform the filtering on the rotation speed through dual undifferentiated low-pass filters with different filtering coefficients L1 and L2 (e.g., a filtering coefficient corresponding to the first low-pass filter is defined as a first filtering coefficient L1, and a filtering coefficient corresponding to the second low-pass filter is defined as a second filtering coefficient L2, and $L1 \neq L2$). The filtering is performed on the rotation speed through the following equation, to obtain a corresponding filtered rotation speed:

$$n\_y = L \cdot (n\_x - n\_y - 1) + n\_y - 1.$$

n_y is a filtered rotation speed currently outputted by a low-pass filter (e.g., the first or the second low-pass filter). L is a filtering coefficient of the low-pass filter. n_x is a currently inputted rotation speed. n_y−1 is a filtered rotation speed outputted by the low-pass filter in the last time. The filtering is performed on the rotation speed through the first low-pass filter to obtain a corresponding first filtered rotation speed n1, and the filtering is performed on the rotation speed through the second low-pass filter to obtain a corresponding second filtered rotation speed n2.

Figure 3:
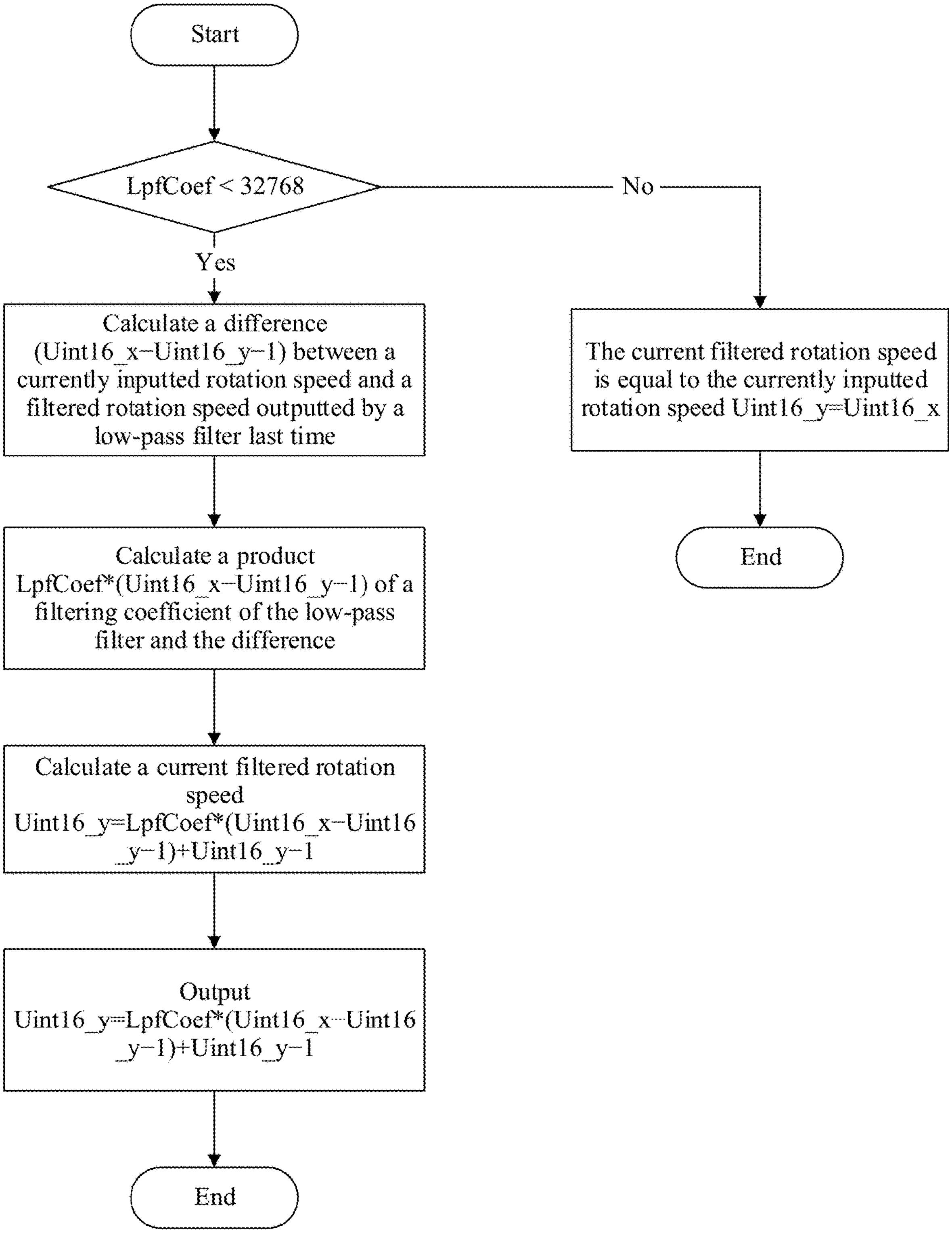
FIG. 3 is a schematic flowchart of calculating a filtered rotation speed according to an embodiment of the present disclosure.

For example, referring to FIG. 3, it may be first determined whether a filtering coefficient LpfCoef of a low-pass filter is less than 32768. If LpfCoef is less than 32768, a difference between a currently inputted rotation speed Uint16_x and a filtered rotation speed Uint16_y−1 outputted by the low-pass filter in the last time, that is, (Uint16_x−Uint16_y−1), is calculated. Then a product of the filtering coefficient LpfCoef of the low-pass filter and the difference, that is, LpfCoef*(Uint16_x−Uint16_y−1), is calculated. Then a current filtered rotation speed Uint16_y, that is, Uint16_y=LpfCoef*(Uint16_x−Uint16_y−1)+Uint16_y−1, is calculated. If LpfCoef is greater than or equal to 32768, the current filtered rotation speed is equal to the currently inputted rotation speed, that is, Uint16_y=Uint16_x. In this way, the first filtered rotation speed n1 and the second filtered rotation speed n2 can be obtained.

Then, a rotation speed fluctuation value Δn is calculated based on an equation of Δn=k1*(n1−n2). k1 is a rotation speed fluctuation calculation coefficient. In the solution of the present disclosure, the rotation speed fluctuation value may be determined through the two low-pass filters based on a real-time rotation speed without a need to use a frequency, and then an active damping torque that needs to be applied is determined. Compared with a conventional solution using a band-pass filtering requires to obtain a rotation speed and a frequency, the solution is applicable to any working condition (that is, can obtain a rotation speed fluctuation value in any frequency band, and is applicable to calculation of a rotation speed fluctuation value in any working condition).

S103: An active damping adjustment coefficient and an active damping clipped torque are obtained based on the rotation speed.

In an embodiment, since a vibration frequency of a transmission system of a vehicle is relatively low, and vibration in a low speed range has significant impact on comfort, in the present disclosure, different active damping adjustment coefficients CoefActiveDamp are set based on different rotation speed ranges. In a low-speed area, the active damping adjustment coefficient CoefActiveDamp is set to a first active damping adjustment coefficient CoefActiveDampOne, to apply a strong vibration suppression effect on the vehicle, which can effectively alleviate the vibration in the low-speed area. In a high-speed area, resonance and vibration of the vehicle do not easily occur. Therefore, the active damping adjustment coefficient CoefActiveDamp is set to a second active damping adjustment coefficient CoefActiveDampTwo. Even if resonance occurs, impact thereof is acceptable after filtering performed by the transmission system. In addition, in a transition region between the low-speed area and the high-speed area, the active damping adjustment coefficient CoefActiveDamp is linearly transitioned, so that an active damping torque TrqActiveDamp process can be smoothly transitioned without generating an adjustment oscillation.

In an example, that an active damping adjustment coefficient and an active damping clipped torque are obtained based on the rotation speed may include the following steps. A first active damping adjustment coefficient is used as the active damping adjustment coefficient if the rotation speed is less than a first active damping switching rotation speed. A second active damping adjustment coefficient is used as the active damping adjustment coefficient if the rotation speed is greater than a second active damping switching rotation speed. The first active damping switching rotation speed is less than the second active damping switching rotation speed. Linear interpolation calculation is performed on the first active damping adjustment coefficient and the second active damping adjustment coefficient based on a ratio relationship or a correlation among the rotation speed, the first active damping switching rotation speed, and the second active damping switching rotation speed to obtain the active damping adjustment coefficient, if the rotation speed is greater than or equal to the first active damping switching rotation speed and less than or equal to the second active damping switching rotation speed.

Figure 4:
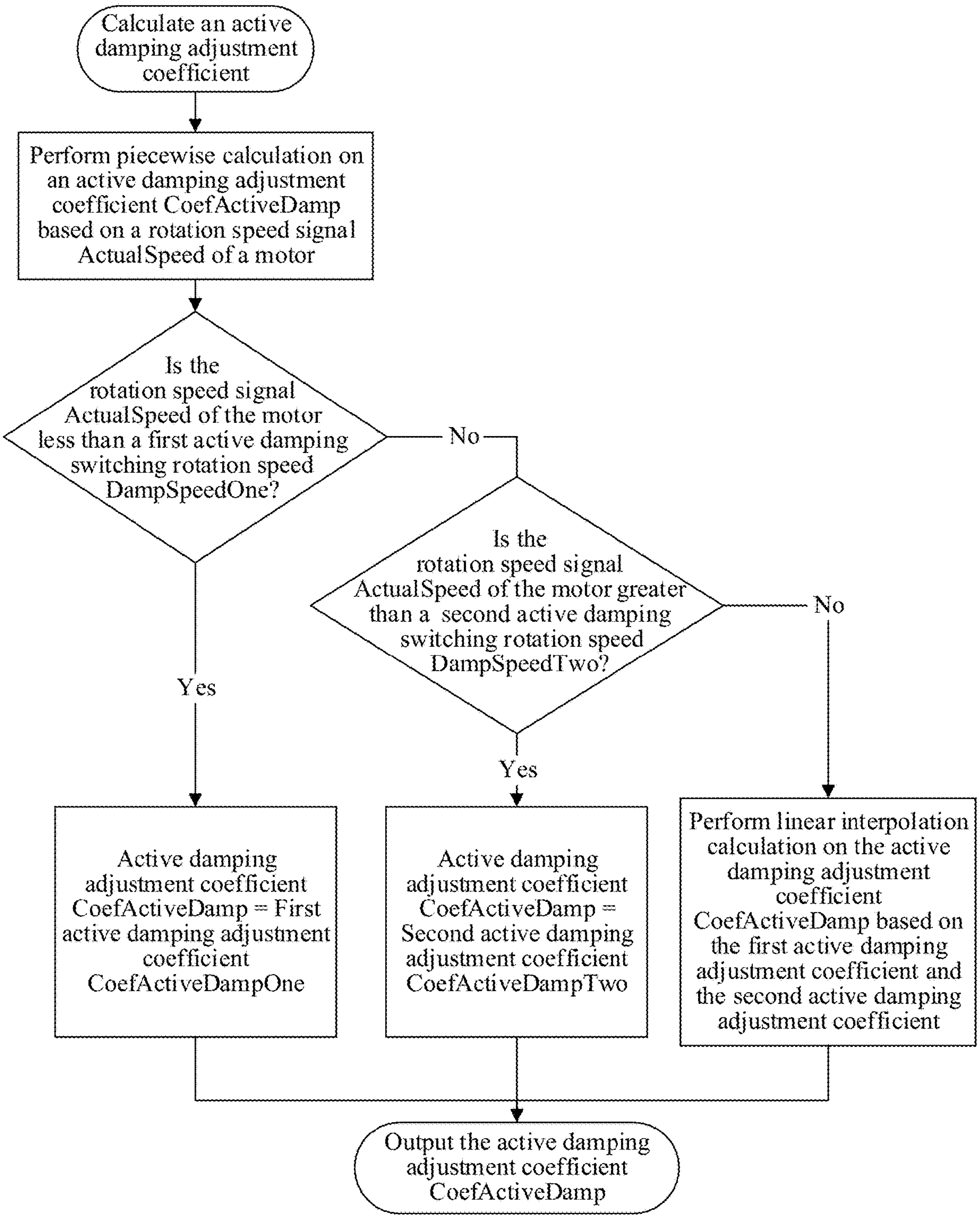
FIG. 4 is a schematic flowchart of obtaining an active damping adjustment coefficient according to an embodiment of the present disclosure.

In an embodiment, referring to FIG. 4, the motor controller performs piecewise calculation on the active damping adjustment coefficient CoefActiveDamp based on a rotation speed ActualSpeed of the motor. When the rotation speed ActualSpeed of the motor is less than a first active damping switching rotation speed DampSpeedOne, the active damping adjustment coefficient CoefActiveDamp is equal to the first active damping adjustment coefficient CoefActiveDampOne. When the rotation speed ActualSpeed of the motor is greater than a second active damping switching rotation speed DampSpeedTwo, the active damping adjustment coefficient CoefActiveDamp is equal to the second active damping adjustment coefficient CoefActiveDampTwo. When the rotation speed ActualSpeed of the motor is greater than or equal to the first active damping switching rotation speed DampSpeedOne and less than or equal to the second active damping switching rotation speed DampSpeedTwo, linear interpolation calculation is performed on the first active damping adjustment coefficient CoefActiveDampOne and the second active damping adjustment coefficient CoefActiveDampTwo based on a ratio relationship among the rotation speed ActualSpeed, the first active damping switching rotation speed DampSpeedOne, and the second active damping switching rotation speed DampSpeedTwo, to obtain the active damping adjustment coefficient CoefActiveDamp.

The linear interpolation calculation is performed for two known points (x1, y1) and (x0, y0) (x ranging between x0 and x1) by successively calculating a distance of x to x0 and a ratio of the distance of x to x0 to a distance of x1 to x0 and multiplying the ratio by a distance of y1 to y0 to calculate a value of y corresponding to a point x, that is, $y=y0+(x1-x0)*(y1-y0)/(x1-x0)$. x is the rotation speed of the motor. x0 is the first active damping switching rotation speed. x1 is the second active damping switching rotation speed. y0 is the first active damping adjustment coefficient. y1 is the second active damping adjustment coefficient. y is active damping adjustment coefficient. The active damping adjustment coefficient may be obtained based on the above equation of $y=y0+(x-x0)*(y1-y0)/(x1-x0)$.

It should be noted that, the first active damping adjustment coefficient and the second active damping adjustment coefficient may be flexibly calibrated without a limitation on a magnitude relationship between the two.

In another example, that an active damping adjustment coefficient and an active damping clipped torque are obtained based on the rotation speed includes the following steps. A first active damping clipped torque value is used as the active damping clipped torque if the rotation speed is less than a first active damping switching rotation speed. A second active damping clipped torque value is used as the active damping clipped torque if the rotation speed is greater than a second active damping switching rotation speed. The first active damping switching rotation speed is less than the second active damping switching rotation speed. Linear interpolation calculation is performed on the first active damping clipped torque value and the second active damping clipped torque value based on a ratio relationship among the rotation speed, the first active damping switching rotation speed, and the second active damping switching rotation speed to obtain the active damping clipped torque, if the rotation speed is greater than or equal to the first active damping switching rotation speed and less than or equal to the second active damping switching rotation speed.

Figure 5:
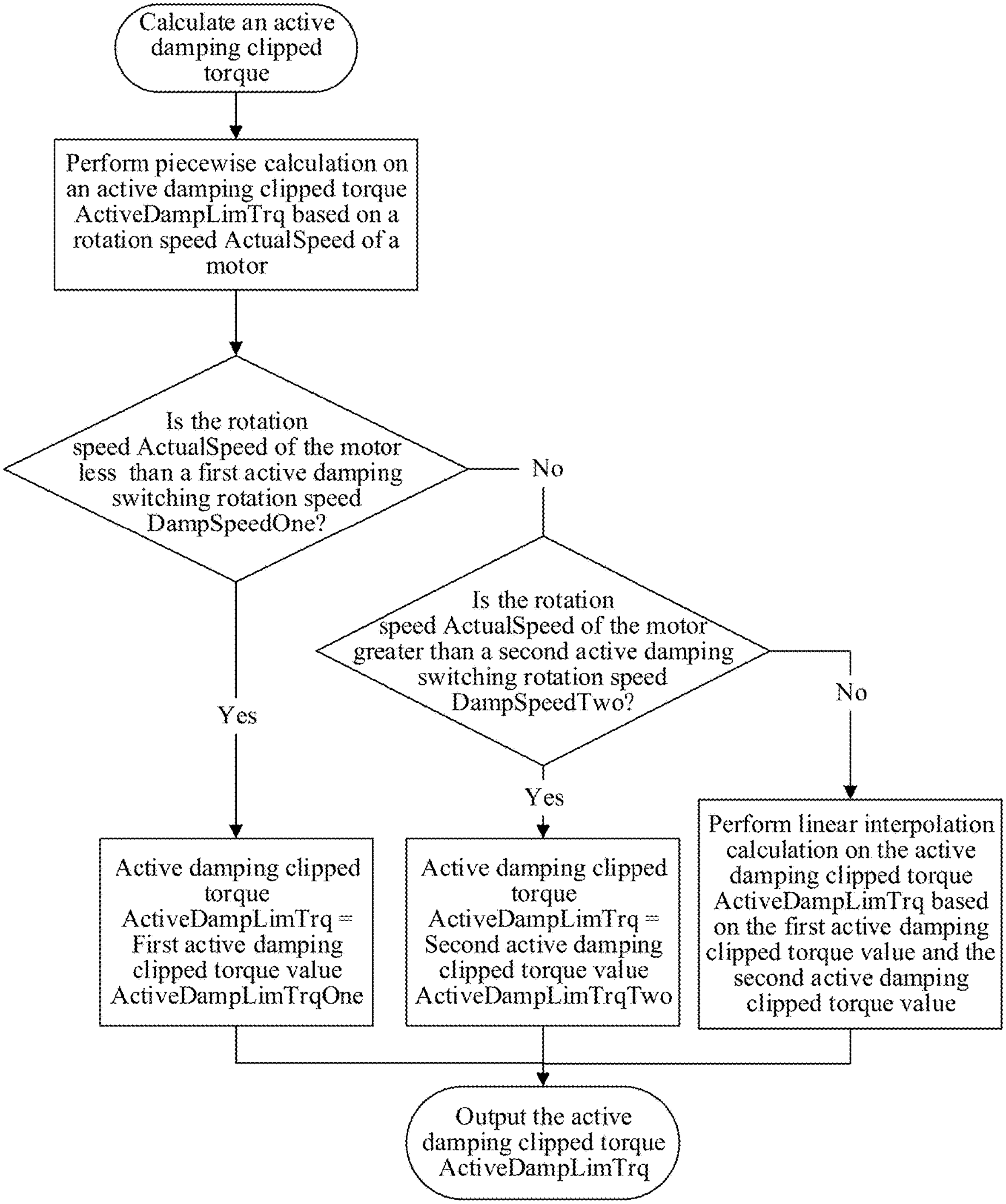
FIG. 5 is a schematic flowchart of obtaining an active damping clipped torque according to an embodiment of the present disclosure.

In an embodiment, referring to FIG. 5, the motor controller performs piecewise calculation on an active damping clipped torque ActiveDampLimTrq based on the rotation speed ActualSpeed of the motor. When the rotation speed ActualSpeed of the motor is less than the first active damping switching rotation speed DampSpeedOne, the active damping clipped torque ActiveDampLimTrq is equal to a first active damping clipped torque value ActiveDampLimTrqOne. When the rotation speed ActualSpeed of the motor is greater than the second active damping switching rotation speed DampSpeedTwo, the active damping clipped torque ActiveDampLimTrq is equal to a second active damping clipped torque value ActiveDampLimTrqTwo. When the rotation speed is greater than or equal to the first active damping switching rotation speed DampSpeedOne and less than or equal to the second active damping switching rotation speed DampSpeedTwo, linear interpolation calculation is performed on the first active damping clipped torque value ActiveDampLimTrqOne and the second active damping clipped torque value ActiveDampLimTrqTwo based on a ratio relationship among the rotation speed ActualSpeed, the first active damping switching rotation speed DampSpeedOne, and the second active damping switching rotation speed DampSpeedTwo, to obtain the active damping clipped torque. Performing the linear interpolation calculation means performing calculation based on the above equation of $y=y0+(x-x0)*(y1-y0)/(x1-x0)$. x is the rotation speed of the motor. x0 is the first active damping switching rotation speed. x1 is the second active damping switching rotation speed. y0 is the first active damping clipped torque value. y1 is the second active damping clipped torque value. y is the active damping clipped torque. The active damping clipped torque may be obtained based on the above equation of $$y=y0+(x-x0)*(y1-y0)/(x1-x0).$$

It should be noted that, the first active damping clipped torque value and the second active damping clipped torque value may be flexibly calibrated without a limitation on a magnitude relationship between the two.

S104: An active damping torque is obtained based on the rotation speed fluctuation value, the active damping adjustment coefficient, and the active damping clipped torque.

In an example, step S104 may include the following steps. A target active damping torque is obtained based on the rotation speed fluctuation value and the active damping adjustment coefficient. The target active damping torque is clipped based on the active damping clipped torque, to obtain the active damping torque.

Figure 6:
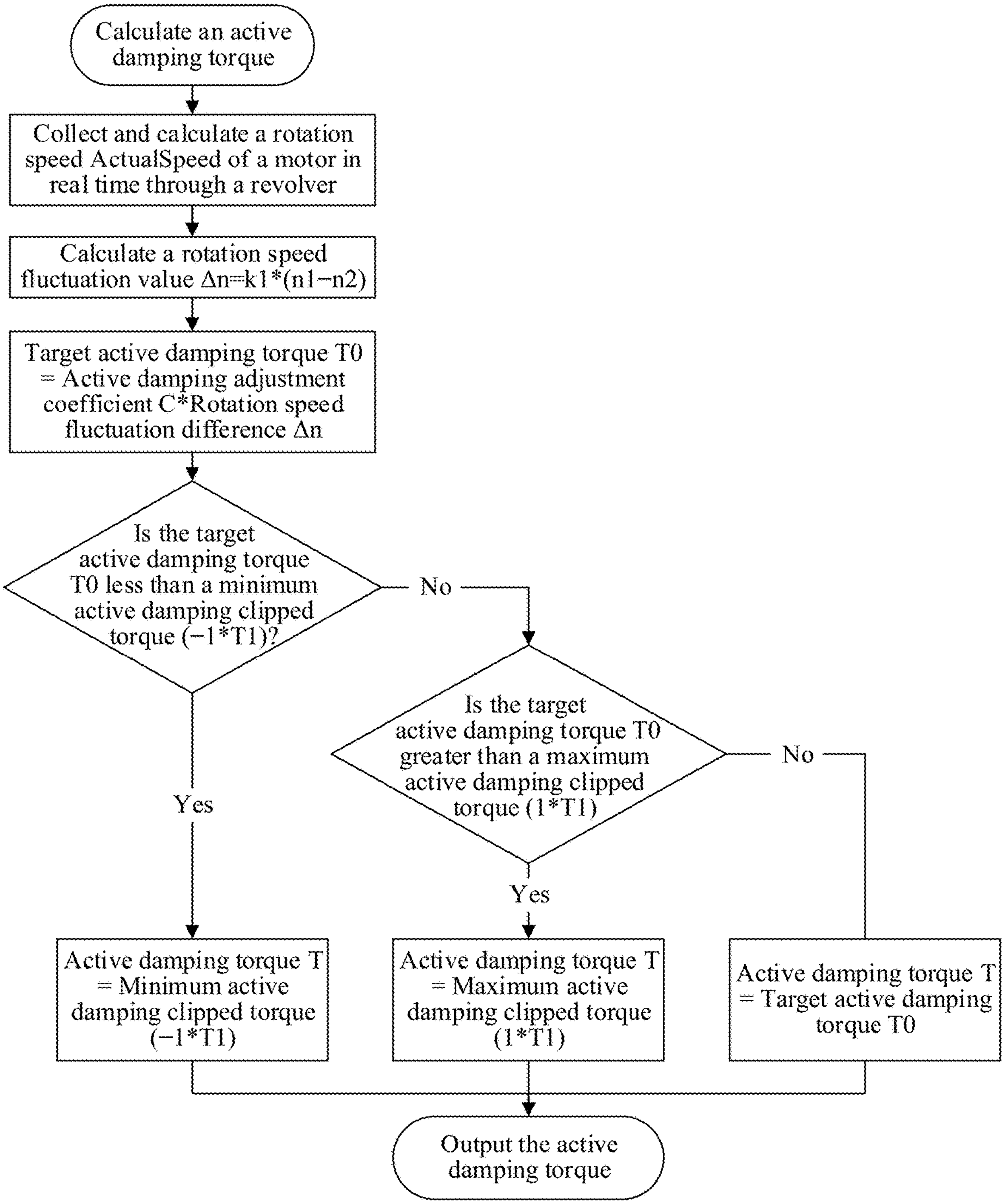
FIG. 6 is a schematic flowchart of obtaining an active damping torque according to an embodiment of the present disclosure.

In an embodiment, referring to FIG. 6, the target active damping torque is obtained through an equation of T0=C·k2·Δn. TO is the target active damping torque. C is the active damping adjustment coefficient. k2 is a preset parameter. Δn is the rotation speed fluctuation value. The target active damping torque and the rotation speed fluctuation value form a tracking compensation effect. Through the calculation equation of the target active damping rotation speed torque, the rotation speed fluctuation value and the target active damping torque may form a direct ratio correspondence, or may form a non-linear correspondence (factors causing vibration and resonance such as a road surface and a resistance are non-linear), which facilitates vibration calibration of a vehicle system (calibration of the active damping adjustment coefficient).

Referring to FIG. 6, the target active damping torque is clipped through an equation of T=min[max(T0, −T1), T1], to obtain the active damping torque. T is the active damping torque. T0 is the target active damping torque. T1 is the active damping clipped torque. In an embodiment, when the target active damping torque TO is less than a minimum active damping clipped torque (−1*T1), the active damping torque T is equal to the minimum active damping clipped torque (−1*T1) (that is, a negative value of the active damping clipped torque). When the target active damping torque TO is greater than a maximum active damping clipped torque (1*T1), the active damping torque T is equal to the maximum active damping clipped torque (1*T1) (that is, a positive value of the active damping clipped torque). When the target active damping torque TO is greater than or equal to the minimum active damping clipped torque (−1*T1), it is determined whether the target active damping torque TO is less than or equal to the maximum active damping clipped torque (1*T1). If the target active damping torque TO is less than or equal to the maximum active damping clipped torque (1*T1), the active damping torque T is equal to the target active damping torque TO. Otherwise, the active damping torque T is equal to the maximum active damping clipped torque (1*T1). The target active damping torque is clipped to ensure a safe torque. Then the target active damping torque is added to a torque instruction to obtain a torque reference for closed-loop torque control. In this way, closed-loop current control is achieved without changing a field-orientated vector control framework, thereby facilitating integration and platformization.

S105: The motor is controlled through the motor controller based on the active damping torque.

In an example, before the motor is controlled through the motor controller based on the active damping torque, the damping control method for a vehicle may further include the following steps. An initial active damping torque is obtained. The active damping torque is updated to 0 if an absolute value of the active damping torque is less than the initial active damping torque.

Figure 7:
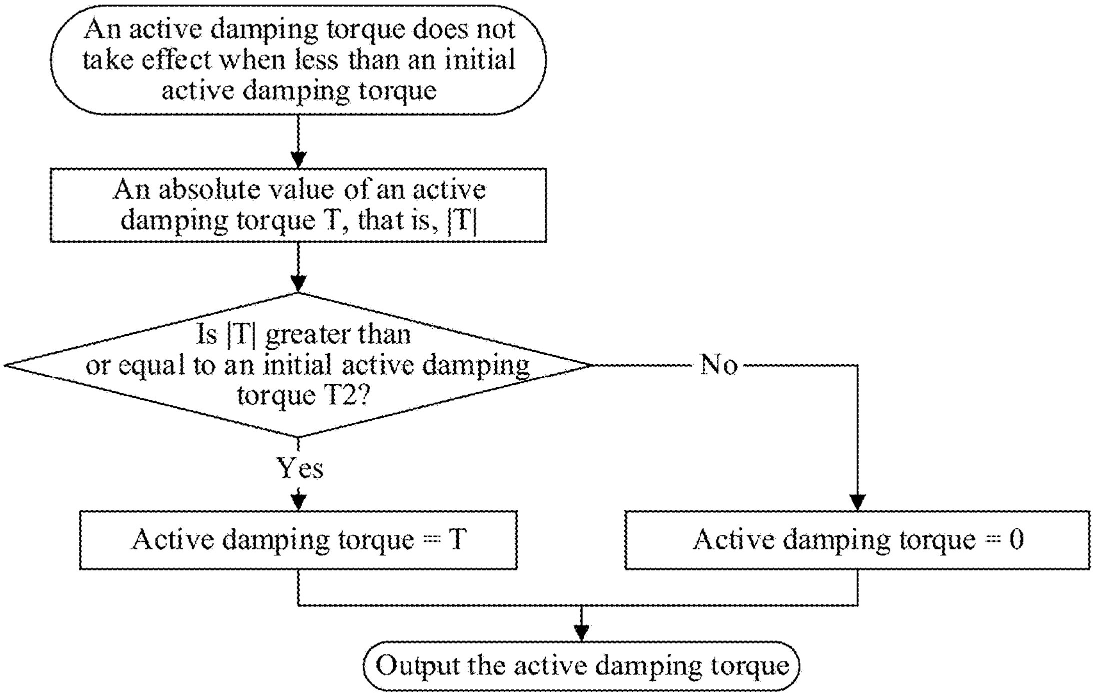
FIG. 7 is a schematic flowchart showing that an active damping torque does not take effect when less than an initial active damping torque according to an embodiment of the present disclosure.

In an embodiment, referring to FIG. 7, before the motor is controlled through the motor controller based on the active damping torque, an initial active damping torque T2 is obtained, and a clip of the active damping torque T is modified to [−T1, −T2]∪[T2, T1]. The absolute value |T| of the active damping torque is less than T2 (that is, the initial active damping torque). In other words, when-T2<T<T2, the active damping torque is updated to 0. In other words, for vibration with a low active damping demand, active damping is not performed. Therefore, the active damping torque is set not to take effect when less than the initial active damping torque, which can avoid impact on a gear meshing force.

In another example, before the motor is controlled through the motor controller based on the active damping torque, the damping control method for a vehicle may further include the following step. The active damping torque is updated to 0 if an active damping function disabling instruction is received.

Figure 8:
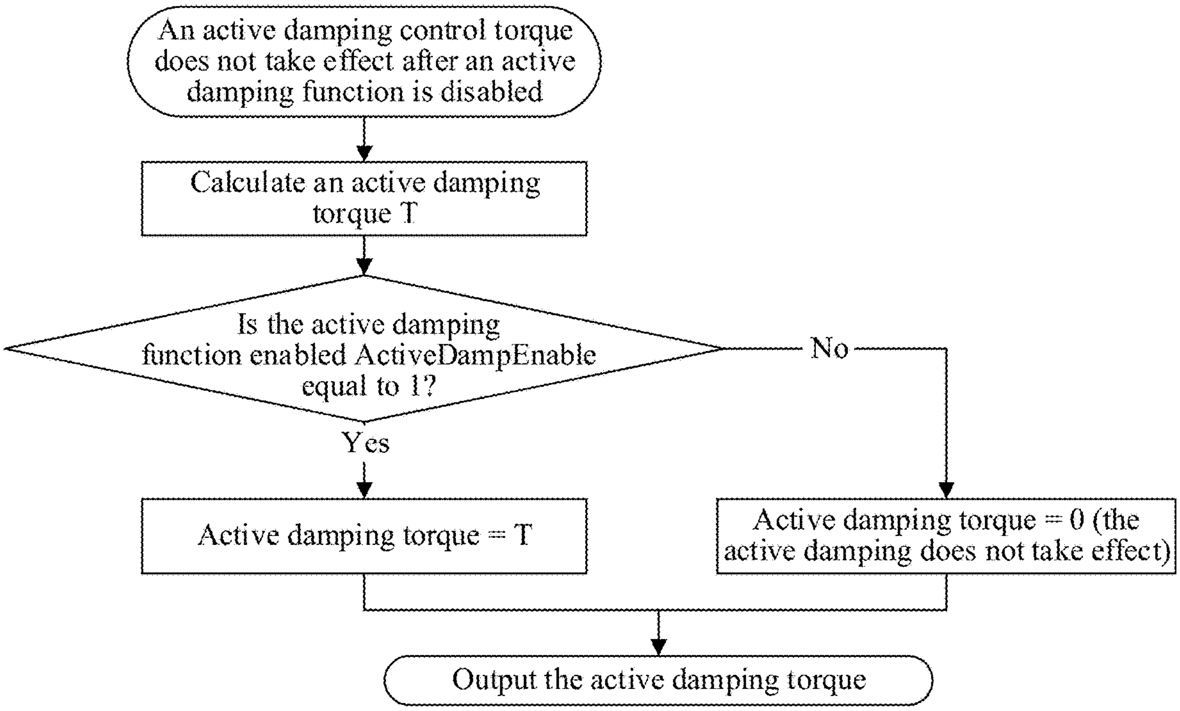
FIG. 8 is a schematic flowchart of disabling an active damping function according to an embodiment of the present disclosure.

In an embodiment, referring to FIG. 8, if the motor controller receives the active damping function disabling instruction from the vehicle controller before the motor is controlled through the motor controller based on the active damping torque, that is, when active damping enable ActiveDampEnable is not 1, the active damping torque is updated to 0.

In summary, according to the damping control method for a vehicle, the rotation speed fluctuation value may be determined merely through the two low-pass filters based on a real-time rotation speed without a need to use a frequency, then the active damping torque is obtained based on the rotation speed fluctuation value, the active damping adjustment coefficient, and the active damping clipped torque, and then the motor is controlled through the motor controller based on the active damping torque. The method is applicable to a wide range of working conditions, is easy to implement and verify, and can effectively eliminate vehicle vibration at lower costs.

The present disclosure further provides a vehicle controller.

Figure 9:
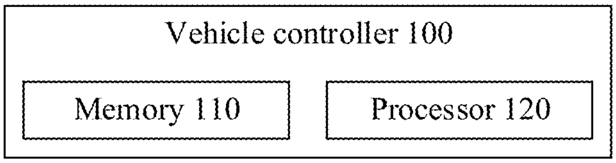
FIG. 9 is a schematic structural diagram of a vehicle controller according to an embodiment of the present disclosure.

FIG. 9 is a schematic structural diagram of a vehicle controller according to an embodiment of the present disclosure. As shown in FIG. 9, a vehicle controller 100 includes a memory 110, a processor 120, and a computer program stored in the memory 110. The computer program, when executed by the processor 120, implements the above damping control method for a vehicle.

In an embodiment, the vehicle controller 100 controls an active damping function of a motor controller to act through calibration parameters (to be specific, active damping enable ActiveDampEnable, a first active damping adjustment coefficient CoefActiveDampOne, a second active damping adjustment coefficient CoefActiveDampTwo, a first active damping clipped torque value ActiveDampLimTrqOne, a second active damping clipped torque value ActiveDampLimTrqTwo, a first active damping switching rotation speed DampSpeedOne, a second active damping switching rotation speed DampSpeedTwo, a first filtering coefficient corresponding to a first low-pass filter, a second filtering coefficient L2 corresponding to a second low-pass filter, and an initial active damping torque T2), which improves a calculation precision.

According to the vehicle controller in the embodiments of the present disclosure, the computer program corresponding to the damping control method for a vehicle stored therein is executed by the processor, so that vehicle vibration can be effectively eliminated at lower costs.

The present disclosure further provides a vehicle.

Figure 10:
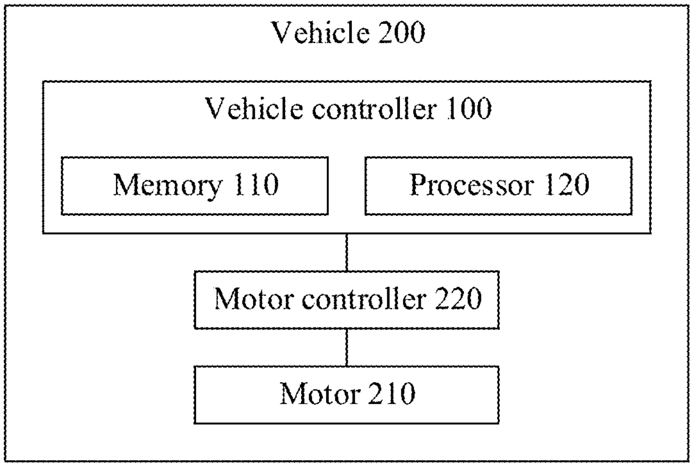
FIG. 10 is a schematic structural diagram of a vehicle according to an embodiment of the present disclosure.

FIG. 10 is a schematic structural diagram of a vehicle according to an embodiment of the present disclosure. As shown in FIG. 10, the vehicle 200 includes a motor 210, a motor controller 220, and the above vehicle controller 100.

In an embodiment, the motor controller 220 sends a rotation speed of the motor and a torque of the motor to the vehicle controller 100 through a CAN line. The vehicle controller 100 receives an operation mode (for example, an economic mode (ecology conservation optimization, ECO), a standard mode (NORMAL), or a sport mode (SPORT)), a throttle signal, a brake signal, an acceleration signal, a vehicle speed signal, the torque of the motor, the rotation speed of the motor, and various working state signals during operation of the vehicle 200. The vehicle controller calculates a target torque (which is sent by the vehicle controller 100 to the motor controller 220) based on the received signal and a throttle demand, and identifies an operating status of the vehicle to control a vehicle damping control parameter. The motor controller 220 responds to the target torque of the vehicle controller 100, and feeds back signals such as the rotation speed of the motor and the torque of the motor in real time.

According to the vehicle in the embodiments of the present disclosure, an architecture in which the motor controller and the above vehicle controller work in combination is implemented. To be specific, the motor controller obtains the rotation speed of the motor and provides the rotation speed of the motor to the vehicle controller, the vehicle controller calculates a required active damping torque for the motor controller, and then the motor controller controls the motor based on the active damping torque. In this way, a communication delay time is reduced.

It should be noted that, the logic and/or steps shown in the flowcharts or described in other manners herein may be regarded as a sequence list of executable instructions for implementing logical functions, which may be implemented in any non-transitory computer-readable medium for use by or in combination with an instruction execution system, device, or apparatus (such as a computer-based system, a system including a processor, or other systems that can obtain instructions from the instruction execution system, device, or apparatus and execute the instructions). In this specification, a "non-transitory computer-readable medium" may be any device that can include, store, communicate, propagate, or transmit a program for use by or in combination with the instruction execution system, device, or apparatus. More examples (a non-exhaustive list) of the computer-readable storage medium include an electrical connection portion (an electronic device) with one or more wires, a portable computer case (a magnetic device), a random access memory (RAM), a read-only memory (ROM), an erasable programmable read-only memory (EPROM or a flash memory), an optical fiber device, and a portable compact disk read-only memory (CDROM). In addition, the non-transitory computer-readable medium even may be paper or other suitable media on which the program may be printed, because the program may be obtained electronically, for example, by optically scanning the paper or the other media, then performing editing, interpreting, or processing in other suitable manners if necessary, and then performing storage in a computer memory.

It should be understood that, parts of the present disclosure may be implemented by hardware, software, firmware, or a combination thereof. In the above implementations, multiple steps or methods may be implemented by software or firmware stored in a memory and executable by a proper instruction execution system. For example, if the multiple steps or methods are implemented by hardware, same as another implementation, the multiple steps or methods may be implemented through any of the following technologies known in the art or a combination thereof: a discrete logic circuit with a logic gate circuit for implementing a logic function for a data signal, a dedicated integrated circuit with a proper combinational logic gate circuit, a programmable gate array (PGA), a field programmable gate array (FPGA), and the like.

In the descriptions of the specification, a description with reference to terms such as "an embodiment", "some embodiments", "an example", "a specific example", or "some examples" means that features, structures, materials, or characteristics described with reference to the embodiment or the example are included in at least one embodiment or example of the present disclosure. In this specification, expressions of the above terms do not necessarily mean the same embodiment or example. In addition, the described features, structures, materials, or characteristics may be combined in a proper manner in any one or more embodiments or examples.

In the descriptions of this specification, orientation or position relationships indicated by the terms such as "center", "longitudinal", "transverse", "length", "width", "thickness", "up", "down", "front", "rear", "left", "right", "vertical", "horizontal", "top", "bottom", "inside", "outside", "clockwise", "anticlockwise", "axial direction", "radial direction", and "circumferential direction" are based on orientation or position relationships shown in the drawings, and do not indicate or imply that the mentioned device or element needs to have a particular orientation or be constructed and operated in a particular orientation. Therefore, such terms should not be construed as a limitation on the present disclosure.

In addition, the terms "first" and "second" are merely used for description, and cannot be construed as indicating or implying relative importance or implying a quantity of indicated technical features. Therefore, features defined with "first" and "second" may explicitly or implicitly include at least one of the features. In the descriptions of the present disclosure, unless explicitly specified, "multiple" means at least two, for example, two or three.

In the descriptions of this specification, unless otherwise specified, the terms such as "mount", "connect", "connection", and "fix" should be understood in a broad sense. For example, the connection may be a fixed connection, a detachable connection, or an integral connection; or may be a mechanical connection or an electrical connection; or may be a direct connection, an indirect connection through an intermediate medium, internal communication between two elements, or an interaction relationship between two elements, unless otherwise explicitly specified. A person of ordinary skill in the art may understand meanings of the terms in the present disclosure based on situations.

In the present disclosure, unless otherwise explicitly specified and defined, that a first feature is "on" or "under" a second feature may mean that the first feature is in direct contact with the second feature or that the first feature is in indirect contact with the second feature through an intermediate medium. In addition, that the first feature is "above", "over", or "on" the second feature may mean that the first feature is directly above or obliquely above the second feature, or may merely mean that the first feature is at a higher horizontal position than the second feature. That the first feature is "below", "under", and "beneath" the second feature may mean that the first feature is directly below the second feature or obliquely below the second feature, or may merely mean that the first feature is at a lower horizontal position than the second feature.

Although the embodiments of the present disclosure are shown and described above, it may be understood that, the above embodiments are examples and should not be understood as a limitation on the present disclosure. A person of ordinary skill in the art may make changes, modifications, replacements, or variations to the above embodiments within the scope of the present disclosure.

What is claimed is:

1. A damping control method for a vehicle, the vehicle comprising a motor and a motor controller, the method comprising:

obtaining a rotation speed of the motor;

filtering the rotation speed through a first low-pass filter to obtain a first filtered rotation speed, filtering the rotation speed through a second low-pass filter to obtain a second filtered rotation speed, and obtaining, by a vehicle controller, a rotation speed fluctuation value based on the first filtered rotation speed and the second filtered rotation speed;

obtaining, by the vehicle controller, an active damping adjustment coefficient based on the rotation speed, comprising:

in response to that the rotation speed is less than a first active damping switching rotation speed, reading a first active damping adjustment coefficient to be the active damping adjustment coefficient;

in response to that the rotation speed is greater than a second active damping switching rotation speed, reading a second active damping adjustment coefficient to be the active damping adjustment coefficient, wherein the first active damping switching rotation speed is less than the second active damping switching rotation speed; and in response to that the rotation speed is greater than or equal to the first active damping switching rotation speed and less than or equal to the second active damping switching rotation speed, performing linear interpolation calculation on the first active damping adjustment coefficient and the second active damping adjustment coefficient based on a correlation among the rotation speed, the first active damping switching rotation speed, and the second active damping switching rotation speed to obtain the active damping adjustment coefficient;

obtaining, by the vehicle controller, an active damping clipped torque based on the rotation speed;

obtaining, by the vehicle controller, an active damping torque based on the rotation speed fluctuation value, the active damping adjustment coefficient, and the active damping clipped torque; and controlling, by the motor controller, the motor based on the active damping torque.

2. The damping control method according to claim 1, wherein the obtaining, by the vehicle controller, the active damping clipped torque based on the rotation speed comprises:

in response to that the rotation speed is less than the first active damping switching rotation speed, reading a first active damping clipped torque value to be the active damping clipped torque;

in response to that the rotation speed is greater than the second active damping switching rotation speed, reading a second active damping clipped torque value to be the active damping clipped torque, wherein the first active damping switching rotation speed is less than the second active damping switching rotation speed; and in response to that the rotation speed is greater than or equal to the first active damping switching rotation speed and less than or equal to the second active damping switching rotation speed, performing linear interpolation calculation on the first active damping clipped torque value and the second active damping clipped torque value based on the correlation among the rotation speed, the first active damping switching rotation speed, and the second active damping switching rotation speed to obtain the active damping clipped torque.

3. The damping control method according to claim 1, wherein the obtaining, by the vehicle controller, the active damping torque based on the rotation speed fluctuation value, the active damping adjustment coefficient, and the active damping clipped torque comprises:

obtaining a target active damping torque based on the rotation speed fluctuation value and the active damping adjustment coefficient; and clipping the target active damping torque based on the active damping clipped torque, to obtain the active damping torque.

4. The damping control method according to claim 3, wherein the target active damping torque is obtained through:

$$T0 = C \cdot k2 \cdot \Delta n,$$

wherein T0 is the target active damping torque; C is the active damping adjustment coefficient; k2 is a preset parameter; and Δn is the rotation speed fluctuation value.

5. The damping control method according to claim 3, wherein the clipping the target active damping torque based on the active damping clipped torque, to obtain the active damping torque comprises:

in response to that the target active damping torque is less than a minimum active damping clipped torque, reading the minimum active damping clipped torque to be the active damping torque, wherein the minimum active damping clipped torque is a negative value of the active damping clipped torque;

in response to that the target active damping torque is greater than a maximum active damping clipped torque, reading the maximum active damping clipped torque to be the active damping torque, wherein the maximum active damping clipped torque is the active damping clipped torque; and in response to that the target active damping torque is greater than or equal to the minimum active damping clipped torque and less than or equal to the maximum active damping clipped torque, reading the target active damping torque to be the active damping torque.

6. The damping control method according to claim 1, wherein the obtaining, by the vehicle controller, the rotation speed fluctuation value based on the first filtered rotation speed and the second filtered rotation speed comprises:

calculating a first difference between the first filtered rotation speed and the second filtered rotation speed; and obtaining the rotation speed fluctuation value by calculating a product of a rotation speed fluctuation calculation coefficient and the first difference.

7. The damping control method according to claim 1, wherein the filtering is performed on the rotation speed through:

$$n\_y = L \cdot (n\_x - n\_y - 1) + n\_y - 1,$$

wherein n_y is a filtered rotation speed outputted by the first or second low-pass filter in a current time; L=L1 is a filtering coefficient of the first low-pass filter, and L=L2 is a filtering coefficient of the second low-pass filter; n_x is an inputted rotation speed in the current time; and n_y−1 is a filtered rotation speed outputted by the first or second low-pass filter in a previous time; and L1≠L2.

8. The damping control method according to claim 1, wherein before the controlling, by the motor controller, the motor based on the active damping torque, the method further comprises:

obtaining an initial active damping torque; and in response to that an absolute value of the active damping torque is less than the initial active damping torque, updating the active damping torque to 0.

9. The damping control method according to claim 1, wherein before the controlling, by the motor controller, the motor based on the active damping torque, the method further comprises:

in response to that an active damping function disabling instruction is received, updating the active damping torque to about 0.

10. A vehicle controller, comprising a memory, a processor, and a computer program stored in the memory, wherein the processor is configured to execute the computer program to perform operations comprising:

obtaining a rotation speed of a motor of a vehicle;

filtering the rotation speed through a first low-pass filter to obtain a first filtered rotation speed, filtering the rotation speed through a second low-pass filter to obtain a second filtered rotation speed, and obtaining a rotation speed fluctuation value based on the first filtered rotation speed and the second filtered rotation speed;

obtaining an active damping adjustment coefficient based on the rotation speed, comprising:

in response to that the rotation speed is less than a first active damping switching rotation speed, reading a first active damping adjustment coefficient to be the active damping adjustment coefficient;

in response to that the rotation speed is greater than a second active damping switching rotation speed, reading a second active damping adjustment coefficient to be the active damping adjustment coefficient, wherein the first active damping switching rotation speed is less than the second active damping switching rotation speed; and in response to that the rotation speed is greater than or equal to the first active damping switching rotation speed and less than or equal to the second active damping switching rotation speed, performing linear interpolation calculation on the first active damping adjustment coefficient and the second active damping adjustment coefficient based on a correlation among the rotation speed, the first active damping switching rotation speed, and the second active damping switching rotation speed to obtain the active damping adjustment coefficient;

obtaining an active damping clipped torque based on the rotation speed;

obtaining an active damping torque based on the rotation speed fluctuation value, the active damping adjustment coefficient, and the active damping clipped torque; and controlling, by a motor controller of the vehicle, the motor based on the active damping torque.

11. The vehicle controller according to claim 10, wherein the obtaining the active damping clipped torque based on the rotation speed comprises:

in response to that the rotation speed is less than the first active damping switching rotation speed, reading a first active damping clipped torque value to be the active damping clipped torque;

in response to that the rotation speed is greater than the second active damping switching rotation speed, reading a second active damping clipped torque value to be the active damping clipped torque, wherein the first active damping switching rotation speed is less than the second active damping switching rotation speed; and in response to that the rotation speed is greater than or equal to the first active damping switching rotation speed and less than or equal to the second active damping switching rotation speed, performing linear interpolation calculation on the first active damping clipped torque value and the second active damping clipped torque value based on the correlation among the rotation speed, the first active damping switching rotation speed, and the second active damping switching rotation speed to obtain the active damping clipped torque.

12. The vehicle controller according to claim 10, wherein the obtaining, by the vehicle controller, the active damping torque based on the rotation speed fluctuation value, the active damping adjustment coefficient, and the active damping clipped torque comprises:

obtaining a target active damping torque based on the rotation speed fluctuation value and the active damping adjustment coefficient; and clipping the target active damping torque based on the active damping clipped torque, to obtain the active damping torque.

13. The vehicle controller according to claim 12, wherein the target active damping torque is obtained through:

$$T0 = C \cdot k2 \cdot \Delta n,$$

wherein T0 is the target active damping torque; C is the active damping adjustment coefficient; k2 is a preset parameter; and Δn is the rotation speed fluctuation value.

14. The vehicle controller according to claim 12, wherein the clipping the target active damping torque based on the active damping clipped torque, to obtain the active damping torque comprises:

in response to that the target active damping torque is less than a minimum active damping clipped torque, reading the minimum active damping clipped torque to be the active damping torque, wherein the minimum active damping clipped torque is a negative value of the active damping clipped torque;

in response to that the target active damping torque is greater than a maximum active damping clipped torque, reading the maximum active damping clipped torque to be the active damping torque, wherein the maximum active damping clipped torque is the active damping clipped torque; and in response to that the target active damping torque is greater than or equal to the minimum active damping clipped torque and less than or equal to the maximum active damping clipped torque, reading the target active damping torque to be the active damping torque.

15. The vehicle controller according to claim 10, wherein the obtaining, by the vehicle controller, the rotation speed fluctuation value based on the first filtered rotation speed and the second filtered rotation speed comprises:

calculating a first difference between the first filtered rotation speed and the second filtered rotation speed; and obtaining the rotation speed fluctuation value by calculating a product of a rotation speed fluctuation calculation coefficient and the first difference.

16. The vehicle controller according to claim 10, wherein the filtering is performed on the rotation speed through:

$$n\_y = L \cdot (n\_x - n\_y - 1) + n\_y - 1,$$

wherein n_y is a filtered rotation speed outputted by the first or second low-pass filter in a current time; L=L1 is a filtering coefficient of the first low-pass filter, and L=L2 is a filtering coefficient of the second low-pass filter; n_x is an inputted rotation speed in the current time; and n_y−1 is a filtered rotation speed outputted by the first or second low-pass filter in a previous time; and L1/L2.

17. The vehicle controller according to claim 10, wherein before the controlling, by the motor controller, the motor based on the active damping torque, the operations further comprise:

obtaining an initial active damping torque; and in response to that an absolute value of the active damping torque is less than the initial active damping torque, updating the active damping torque to 0.

18. A vehicle, comprising a motor, a motor controller, and a vehicle controller, the vehicle controller comprising a memory, a processor, and a computer program stored in the memory, wherein the processor is configured to execute the computer program to perform operations comprising:

obtaining a rotation speed of the motor;

filtering the rotation speed through a first low-pass filter to obtain a first filtered rotation speed, filtering the rotation speed through a second low-pass filter to obtain a second filtered rotation speed, and obtaining, by the vehicle controller, a rotation speed fluctuation value based on the first filtered rotation speed and the second filtered rotation speed;

obtaining, by the vehicle controller, an active damping adjustment coefficient based on the rotation speed, comprising:

in response to that the rotation speed is less than a first active damping switching rotation speed, reading a first active damping adjustment coefficient to be the active damping adjustment coefficient;

in response to that the rotation speed is greater than a second active damping switching rotation speed, reading a second active damping adjustment coefficient to be the active damping adjustment coefficient, wherein the first active damping switching rotation speed is less than the second active damping switching rotation speed; and in response to that the rotation speed is greater than or equal to the first active damping switching rotation speed and less than or equal to the second active damping switching rotation speed, performing linear interpolation calculation on the first active damping adjustment coefficient and the second active damping adjustment coefficient based on a correlation among the rotation speed, the first active damping switching rotation speed, and the second active damping switching rotation speed to obtain the active damping adjustment coefficient;

obtaining, by the vehicle controller, an active damping clipped torque based on the rotation speed;

obtaining, by the vehicle controller, an active damping torque based on the rotation speed fluctuation value, the active damping adjustment coefficient, and the active damping clipped torque; and controlling, by the motor controller, the motor based on the active damping torque.

* * * * *